(12) United States Patent
Wijlens et al.

(10) Patent No.: US 10,655,765 B2
(45) Date of Patent: May 19, 2020

(54) FITTING FOR COUPLING TO A PIPE

(71) Applicant: Georg Fischer WAGA N.V., Epe (NL)

(72) Inventors: Jeroen Wijlens, Haaksbergen (NL); Michel Paul Hulsebos, Holten (NL); Roel Alexander Maria Wellink, Usselo (NL)

(73) Assignee: Georg Fischer WAGA N.V., Epe (NL)

( * ) Notice: Subject to any disclaimer, the term of this patent is extended or adjusted under 35 U.S.C. 154(b) by 0 days.

(21) Appl. No.: 15/311,451

(22) PCT Filed: May 21, 2015

(86) PCT No.: PCT/EP2015/061204
§ 371 (c)(1),
(2) Date: Nov. 15, 2016

(87) PCT Pub. No.: WO2015/177259
PCT Pub. Date: Nov. 26, 2015

(65) Prior Publication Data
US 2017/0082226 A1    Mar. 23, 2017

(30) Foreign Application Priority Data

May 22, 2014    (NL) ...................................... 2012869
Jul. 23, 2014    (NL) ...................................... 2013241

(51) Int. Cl.
| | | |
|---|---|---|
| F16L 21/08 | (2006.01) |
| F16L 21/04 | (2006.01) |
| F16L 19/065 | (2006.01) |
| F16L 37/62 | (2006.01) |
| F16L 17/10 | (2006.01) |
| F16L 21/00 | (2006.01) |

(52) U.S. Cl.
CPC ............... *F16L 21/08* (2013.01); *F16L 17/10* (2013.01); *F16L 19/065* (2013.01); *F16L 21/007* (2013.01); *F16L 21/04* (2013.01); *F16L 37/62* (2013.01)

(58) Field of Classification Search
USPC .................................................. 285/339, 342
See application file for complete search history.

(56) References Cited

U.S. PATENT DOCUMENTS 5,297,826 A * 3/1994 Percebois ............... F16L 21/08
285/232
2015/0308594 A1    10/2015    Hulsebos et al.

FOREIGN PATENT DOCUMENTS

| EP | 0794378 A2 | 9/1997 |
| EP | 1906073 A1 | 4/2008 |

(Continued)

OTHER PUBLICATIONS

International Search Report and Written Opinion for PCT/EP2015/061204, dated Aug. 17, 2015; ISA/EP.

*Primary Examiner* — Anna M Momper
*Assistant Examiner* — Fannie C Kee
(74) *Attorney, Agent, or Firm* — Harness, Dickey & Pierce, P.L.C.

(57) ABSTRACT

A fitting for coupling to a pipe includes a sleeve for receiving the pipe and a sealing member to provide a seal between the sleeve and the pipe. A pressure ring acts on a pressure member through adjoining slanting contacting surfaces of the pressure ring and pressure member, respectively. The sealing member is configured to be displaced from the slanting contact surfaces to preserve the life of the seal.

7 Claims, 1 Drawing Sheet

(56) References Cited

FOREIGN PATENT DOCUMENTS

| GB | 2415472 A | 12/2005 |
|----|-----------|---------|
| WO | WO-03010461 A1 | 2/2003 |
| WO | WO-2011120669 A1 | 10/2011 |

* cited by examiner

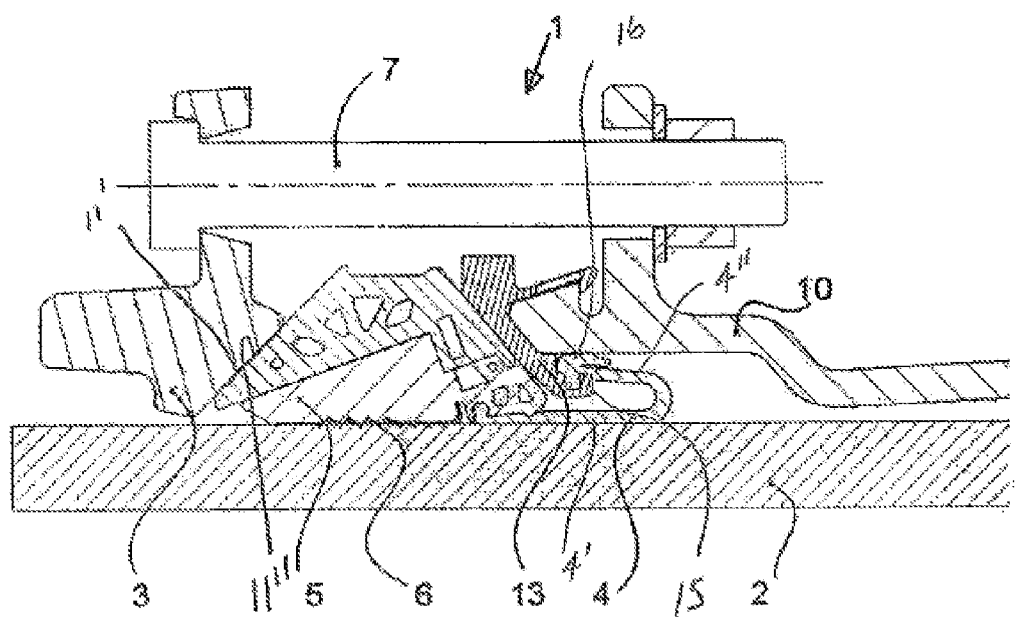

FITTING FOR COUPLING TO A PIPE

CROSS-REFERENCE TO RELATED APPLICATIONS

This application is a 371 National Stage of International Application No. PCT/EP2015/061204, filed on May 21, 2015, and published in English as WO 2015/177259 A1 on Nov. 26, 2015. This application claims priority to Netherlands Application No. 2012869, filed on May 22, 2014 and Netherlands Application No. 2013241, filed on Jul. 23, 2014. The entire disclosures of the above applications are incorporated herein by reference.

FIELD

The disclosure relates to a fitting for coupling to at least one pipe.

BACKGROUND

This section provides background information related to the present disclosure which is not necessarily prior art.

EP-A-0 794 378 discloses a fitting for coupling to at least one pipe, comprising:
- a sleeve for receiving the pipe;
- at least one sealing member to provide a seal between the sleeve and the pipe;
- a pressure member for applying a pressure to the sleeve and to the pipe;
- gripper teeth provided on the pressure member and arranged to act on the pipe; and
- actuation means for exerting a pressure to the pressure member comprising a pressure ring acting on the pressure member through adjoining slanting contacting surfaces of said pressure ring and pressure member respectively.

In the fitting of EP-A-0 794 378 the sealing member is arranged between the pressure member and the pipe and between the pressure member and the sleeve in order to provide the required seal between the sleeve and the pipe.

A fitting according to the preamble of the main claim is further known from WO2011/120669.

During installation of the fitting the actuation means of the fitting are arranged so as to have the pressure member apply a pressure capable to withstand for a stand time of not less than 50 years axial forces that may act on the pipe which is received in the sleeve; to provide sufficient pressure both on the part of the sealing member positioned between the pressure member and the pipe and on the part of the sealing member positioned between the pressure member and the sleeve; and to compensate for relaxation of the material of the fitting that may occur during said fifty-year stand time. The pressures that are thus applied to the sealing member, in particular on the part of the sealing member between the pressure member and the sleeve are at such a high level that the sealing member, usually rubber, is overstressed in particular when the pipe diameter is larger than 300 mm. It is particularly with diameters larger than 300 mm that the required pretension on the part of the sealing member between the pressure member and the sleeve becomes too high for the rubber of the sealing member to survive and maintain its long-term physical properties.

SUMMARY

This section provides a general summary of the disclosure, and is not a comprehensive disclosure of its full scope or all of its features.

It is therefore an aspect of the disclosure to provide a solution to this problem, and to provide a fitting having a lifetime of at least 50 years, and which can withstand axial forces that may come to work on the pipe during this lifetime whilst maintaining its sealing properties, and which can cope with the general deterioration of the fitting during its lifetime, also when the fitting is dimensioned for pipes having a diameter larger than 300 mm.

The fitting of the disclosure first and foremost is arranged with the feature that the at least one sealing member is connected with or pressed against the sleeve without being positioned between the pressure member and the sleeve. This arranges for a completely closed seal between the sleeve and the pipe wherein the sealing property of the fitting of the disclosure is not linked to the pressure applied by the pressure member. Accordingly the level of the pressure applied by the pressure member has no bearing anymore on the lifetime of the sealing between the pressure member and the sleeve.

In a suitable embodiment opposite extremities of the at least one sealing member are connected to the pressure member and the sleeve respectively.

In a further suitable embodiment the at least one sealing member is connected with or pressed against the sleeve without being positioned between the slanting surfaces of the pressure ring and the pressure member. This contributes to the longevity of the fitting of the disclosure.

In a particular embodiment it is desirable that the fitting comprises a clip for attaching the sealing member to the sleeve. This makes mounting and dismounting of the fitting very easy without sacrificing reliability.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

The disclosure will hereinafter be further elucidated with reference to the drawing.

In the drawing of a single FIG. 1 a preferred embodiment is shown of the fitting of the disclosure.

DETAILED DESCRIPTION

Example embodiments will now be described more fully with reference to the accompanying drawings.

FIG. 1 shows an embodiment of the fitting 1 of the disclosure for application with a pipe 2. The fitting has a sleeve 10 for receiving the pipe 2, at least one sealing member 4 to provide a seal between the sleeve 10 and the pipe 2, a pressure member 5 for applying a pressure to the sleeve 10 and to the pipe 2, gripper teeth 6 provided on the pressure member 5 and arranged to act on the pipe 2, and actuation means 3, 7 for arranging that a pressure is applied to the pressure member 5.

The actuation means 3, 7 comprise a pressure ring 3 acting on the pressure member 5 when the bolt 7 is tightened. The pressure ring 3 has a rearward facing slanting surface 11' that engages forward facing slanting surface 11" on the pressure member 5. This arranges that a force applied to the pressure member 5 in parallel with a longitudinal body axis of the sleeve 10 or the pipe 2, acts on the pressure member 5 with a component perpendicular to said longitudinal body axis of the sleeve 10 on the pipe 2 received in said sleeve 10.

The sealing member 4 is in accordance with the disclosure positioned between the pressure member 5 and the pipe 2 and is connected with or pressed against the sleeve 10 without being positioned between a rear facing slanting surface of the pressure member 5 and a forward facing slanting surface of the sleeve 10. More particularly, the sealing member 4 has an inner portion 4' and an outer portion 4" that is bent back over inner portion 4'.

One of the further characterizing features of the fitting 1 of the disclosure is that it is provided with said sealing member 4 without same being positioned between the slanting surface 11' of the pressure ring 3 and the slanting surface 11" of the pressure member 5.

Furthermore it is preferable that opposite extremities of the at least one sealing member 4 are connected to the pressure member 5 and to the sleeve 10 respectively.

FIG. 1 further shows that the fitting 1 of the disclosure is preferably further provided with a clip 13 for attacking the sealing member 4 to the sleeve 10. This makes mounting and dismounting of the fitting very easy without sacrificing reliability. The clip 13 is wedged between a rearward facing slanting surface on pressure member 5 and a forward facing slanting surface of the sleeve 10. Clip 13 has an inner hook 15 that receives an enlarged head 16 on the end of the outer portion 4" of the sealing member 4. The inner portion 4' of the sealing member 4 lies beneath a rearwardly end face of pressure member 5 adjacent gripper teeth 6.

Thus, it can be seen that the sealing member 4 provides a seal between pipe 2 and the sleeve 10 without being wedged between the pressurized slanting surfaces between the pressure member 5 and the pressure ring 3 (for example slanting surfaces 11", 11'). As a result, the elastic sealing member is free from those stresses resulting in a long life.

Although the disclosure has been discussed in the foregoing with reference to a variety of embodiments of the fitting of the disclosure, the disclosure is not restricted to these particular embodiments which can be varied further in many ways without departing from the disclosure. The discussed exemplary embodiments shall therefore not be used to construe the appended claims strictly in accordance therewith. On the contrary the embodiments are merely intended to explain the wording of the appended claims without intent to limit the claims to the discussed exemplary embodiments. The scope of protection of the disclosure shall therefore be construed in accordance with the appended claims only, wherein a possible ambiguity in the wording of the claims shall be resolved using these exemplary embodiments.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A fitting for coupling to at least one pipe, comprising:
a sleeve for receiving the at least one pipe, the sleeve having a front slanting surface;
at least one sealing member to provide a seal between the sleeve and the at least one pipe;
a pressure member for applying a pressure to the sleeve and to the at least one pipe, the pressure member having a front slanting surface and a rear slanting surface;
gripper teeth provided on the pressure member and arranged to act on the at least one pipe; and
an actuator for exerting a pressure to the pressure member, the actuator including a pressure ring having a rear slanting surface, the pressure ring acting on the pressure member through cooperation between the rear slanting surface of the pressure ring and the front slanting surface of the pressure member;
wherein the at least one sealing member is connected with or pressed against the sleeve without being positioned between either the front slanting surface of the pressure member and the rear slanting surface of the pressure ring, or the rear slanting surface of the pressure member and the front slanting surface of the sleeve; and,
wherein the pressure member engages an upper surface of the at least one sealing member.

2. The fitting according to claim 1, wherein the pressure member has an inner end adjacent the gripper teeth, wherein the at least one sealing member has a first end located between the inner end of the pressure member and the at least one pipe, and wherein the at least one sealing member has a second end that is connected with or pressed against the sleeve.

3. The fitting according to claim 2, wherein the second end of the at least one sealing member is curled back and above the first end of the at least one sealing member.

4. The fitting according to claim 3, further comprising a clip for attaching the second end of the at least one sealing member to the sleeve.

5. The fitting according to claim 2, further comprising a clip for attaching the at least one sealing member to the sleeve.

6. The fitting according to claim 1, further comprising a clip for attaching the at least one sealing member to the sleeve.

7. A fitting for coupling to a pipe, comprising:
a sleeve for receiving the pipe, the sleeve having a front slanting surface;
a sealing member providing a seal between the sleeve and the pipe;
a pressure member for applying a pressure to the sleeve and to the pipe, the pressure member having front and rear slanting surfaces;
gripper teeth provided on the pressure member and arranged to act on the pipe; and
a pressure ring having a rear slanting surface engaging the front slanting surface of the pressure member;
a clip having a front slanting surface, a rear slanting surface, and a hook, the front slanting surface engaging the rear slanting surface of the pressure member;
the sealing member having an inner portion and an outer portion that bends back over and above the inner portion, the inner portion of the sealing member lying beneath a rear portion of the pressure member adjacent the gripper teeth and displaced from the slanting surfaces; and
the outer portion of the sealing member engaging the hook of the clip;
wherein the sealing member is connected with or pressed against the sleeve without being positioned between either the front slanting surface of the pressure member and the rear slanting surface of the pressure ring, or the rear slanting surface of the pressure member and the front slanting surface of the sleeve.

\* \* \* \* \*